April 5, 1955     E. GORIN     2,705,672
MANUFACTURE OF WATER GAS
Filed July 20, 1953
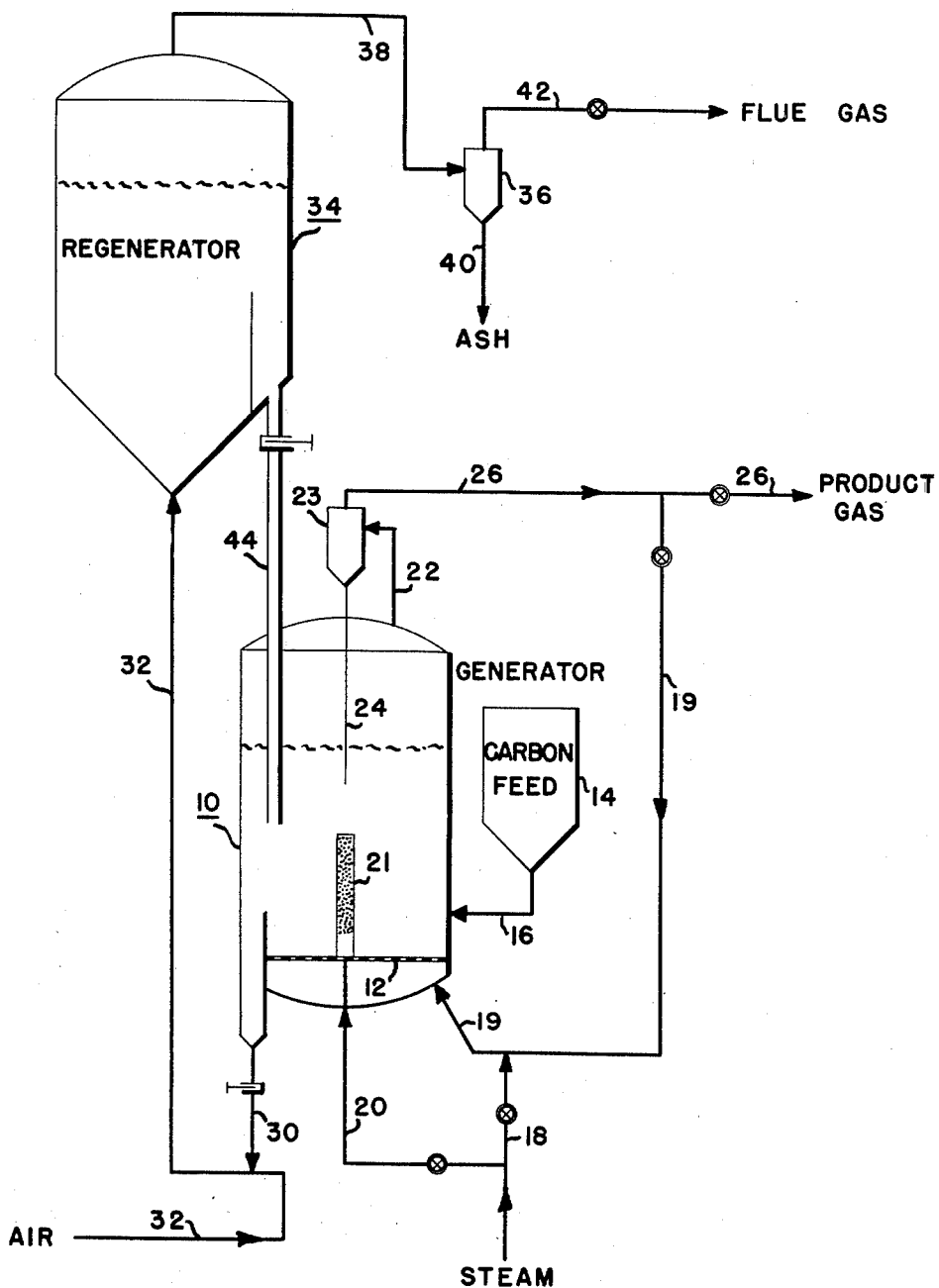
INVENTOR.
EVERETT GORIN
BY
D. Leigh Fowler, Jr.

2,705,672

MANUFACTURE OF WATER GAS

Everett Gorin, Pittsburgh, Pa., assignor to Pittsburgh Consolidation Coal Company, Pittsburgh, Pa., a corporation of Pennsylvania Application July 20, 1953, Serial No. 368,860

3 Claims. (Cl. 48—206)

This invention relates to the manufacture of water gas and, more particularly, to a method of making water gas by reacting a carbonaceous solid with steam in the presence of lime.

The present application is a continuation-in-part of my copending application, Serial Number 99,561, filed June 16, 1949, issued as U. S. Patent No. 2,682,455 June 29, 1954, and assigned to the assignee of the present invention.

In the above-entitled application a process is described for preparing water gas by reacting canbonaceous solids with steam in the presence of calcium oxide under conditions favorable to the substantially complete absorption of the carbon dioxide produced. The calcium oxide serves a dual purpose in such a reaction. Firstly, by absorption of the carbon dioxide produced in the reaction, a substantially carbon dioxide-free gas is obtained that is rich in hydrogen and has a high heat content. Secondly, by virtue of the exothermic character of the lime-carbon dioxide reaction to form calcium carbonate, most if not all the heat required to maintain the endothermic carbon-steam reaction is provided. Thus, the use of expensive oxygen to supply heat by combustion is avoided. While the carbon-steam reaction will proceed under carbon dioxide absorbing conditions over a wide range of temperatures and pressures, for optimum results with respect to the combined factors of steam conversion, thermoneutrality and gas quality, a temperature range of 1500 to 1750° F. and a pressure range of 15 to 50 atmospheres are preferred.

In order to operate the above process in a simple vessel in a continuous manner, it is necessary to feed calcium oxide continuously into the reaction zone to replace calcium carbonate which is formed during the reaction. The calcium carbonate is regenerated in a separate vessel. The fluidized solids technique provides a practical way of accomplishing continuous feeding and withdrawal of solids. The employment of this technique in the reaction vessel promotes optimum mixing of reactants and transfer of heat. For these reasons a fluidized system was selected as the commercially practicable way to conduct the carbon-steam reaction in the presence of lime.

Unfortunately, an unexpected difficulty was encountered in using a fluidized system in the preferred ranges of temperature and pressure specified above. The fluidized bed of solids containing the calcium oxide rapidly agglomerated to a gas impermeable mass. Continuous operation became impossible. The cause of this phenomenon was not readily apparent and, for that matter, is not yet clearly established. According to the literature, lime does not form a hydrate above 1100° F. Yet the agglomerate formation observed under the above conditions could only be attributed to some fusible complex. Whatever the cause, however, it was imperative for continuous operation of the process to provide a solution; that is, some way of preventing the formation of non-fluidizable agglomerates.

In accordance with the present invention, the formation of non-fluidizable agglomerates in the above described reaction system is avoided while still maintaining the preferred conditions of temperature, i. e. 1500 to 1750° F.; of pressure i. e. 15 to 50 atmospheres; of operable fluidization; and of sufficient calcium oxide to absorb the carbon dioxide produced. This result is achieved by maintaining the partial pressure of steam through out the reaction zone below about 13 atmospheres. This steam pressure limitation is critical not because agglomeration ceases entirely below this level but because of a sharp change in the nature of the agglomerates. Below the critical pressure the agglomerates are weak and friable and are easily broken up by the fluidizing action. At steam pressures above this value hard-fused agglomerates are formed which cannot be broken up by fluidization and which rapidly produce an inoperable condition. It has been furthermore found that within the range specified above, the critical steam pressure is for all practical purposes independent of the temperature. The critical pressure was also found to be substantially the same for other rich lime bearing minerals that may be used instead of lime in the process such as dolomite.

In order to ensure that the partial pressure of steam does not exceed the critical value at any point within the reaction zone, it is necessary to place the same steam partial pressure restriction upon steam entering the bottom of the reaction zone. This is so because, despite the agitated state of a fluidized bed, there is still a brief interval of time before newly admitted steam is completely mixed with the solids at the bottom of the reaction zone. This interval of time is sufficient for agglomerated non-fluidizable particles to develop at or near the inlet point. In the case of steam admitted at points above the bottom of the reaction zone, the steam pressure may be somewhat above the critical value because it is immediately mixed with gases produced at a lower point, thereby reducing its partial pressure.

The agglomeration of solids in the steam-carbon-lime system within the temperature and pressure ranges recited was completely unexpected. A study of the literature on this system developed no references bearing on the problem. Nor does the literature disclose the existence of any lime complex that might behave in this manner. A systematic study of the several parameters involved was therefore undertaken to determine the cause and its remedy, if any existed.

It was found that the agglomerates formed only when steam was present with both calcium oxide and calcium carbonate. The only function of carbon dioxide was to convert calcium oxide to carbonate. The agglomerates did not form in an atmosphere composed exclusively of steam if no calcium carbonate were present. It was also established that the agglomerates did not form when calcium carbonate, free of calcium oxide, was contacted with steam, or mixtures of steam and carbon dioxide. They were formed, however, when a mixture of calcium oxide and calcium carbonate was contacted with pure steam under the recited conditions of temperature and pressure. Even when a calcium oxide and carbonate mixture was diluted with as much as 90% by weight of sand a durable agglomerate resulted in the presence of steam. Inert diluents therefore offered no solution.

The above facts indicate that the agglomerate is a complex formed by the interaction of steam, calcium oxide and calcium carbonate. However, attempts to establish the exact identity of the agglomerate have so far been unsuccessful. In physical structure, it is a dense refractory mass, both cohesive and adhesive, and hard enough to resist a high speed metal drill. The original solid particles suffered a complete loss of identity in the agglomerate.

However, it was found during the course of this investigation that under certain conditions the physical character of the agglomerate changed. Instead of rock-like agglomerates, a tenuous, lacy matrix of particles that retained their original identity was formed. These particles were non-adhesive and extremely friable, crumbling under slight application of force. The cause of this change was traced finally to the partial pressure of the steam. An extended series of runs established that the steam partial pressure must not exceed about 13 atmospheres if the formation of non-fluidizable agglomerates is to be avoided. This critical value also was substantially independent of pressure and temperature within the previously recited ranges which in itself was quite surprising. Although the limitation as to maximum steam partial pressure does place a restriction upon the carbon-steam-line system, nevertheless it is possible by accepting it to conduct the reaction in a fluidized system under preferred conditions of operation and on a continuous basis.

For a better understanding of my invention, its objects and advantages, reference should be had to the following description and to the attached drawing, in which an apparatus for carrying out the preferred embodiment of my invention is diagrammatically illustrated.

In the following description of the preferred embodiment of my invention, by way of example only, my improved process is applied to the conversion of char to water gas. The char is the solid low volatile distillation residue produced by the low temperature (i. e. 800–1200° F.) carbonization of high volatile bituminous coal from the Pittsburgh Seam. It is to be understood, however, that my invention is generally applicable to any carbonaceous solids which react with steam to produce water gas.

The apparatus shown in the drawing and its operation will now be described. Numeral 10 designates a reaction vessel adapted to serve as a high pressure water gas generator. A bed of calcium oxide is supported upon a porous plate member 12 disposed near the bottom of the vessel. The bed of lime is first brought to a temperature between 1500 and 1750° F. by any suitable means such as external heating of the vessel or by burning producer gas or pulverized coal within the vessel itself. As soon as this temperature is attained, finely divided char is fed from a hopper 14 through a conduit 16 into vessel 10 where the char is thoroughly mixed with the lime. At the same time steam from a steam line 18 is fed into a recycle gas line 19 where it is mixed with recycle gas in such proportions that its partial pressure is less than 13 atmospheres. The resulting mixture is then introduced into vessel 10 at a point below the porous plate 12 and at fluidizing velocity. Additional steam may be introduced into the interior of the bed of calcium oxide by means of valved conduit 20 which is connected at one end to the steam line 18 and at the other end to a perforated pipe 21 centrally supported within the vessel 10 above the porous plate 12.

The total pressure within vessel 10 is maintained within the range of 15 to 50 atmospheres. In order for the lime to function as a CO₂ absorber, the reaction must be conducted above a minimum pressure which is correlated with the temperature of the generator. For each temperature within the range 1500 to 1750° F. there is a corresponding minimum pressure that must be maintained or exceeded. This relationship between the pressure and temperature is expressed by the following equation:

$$p = 3.40 - 1.89 \times 10^{-2}(t-1430) + 4.48 \times 10^{-4}(t-1430)^2$$

where $p$ is the minimum pressure in atmospheres and $t$ is the reaction temperature in ° F. This relationship is automatically established in the range 1500 to about 1610° F. when the pressure is between 15 and 50 atmospheres since the minimum pressure is below 15 atmospheres in this range. In the range 1610 to 1750° F., however, the pressure must be selected in accordance with the above equation and will lie in the upper portion of the indicated pressure range.

The amount of lime contained in the bed is sufficient to absorb substantially all of the carbon dioxide produced as a result of the reaction between the steam and carbon. Preferably, at least 250 parts by weight of the oxide are fed to the generator 10 for each 100 parts by weight of carbon contained in the char feed. The practice size of the lime and the velocity of the steam are regulated so that the bed of lime is maintained as a fluidized bed comprising a dense phase having a well-defined level above which there is a dilute phase.

The continued maintenance of a fluidizable bed of solids in vessel 10 is essential to the operation of the carbon-steam reaction on a continuous basis. It is therefore necessary, as stated previously, to maintain the partial pressure of steam below about 13 atmospheres throughout the reaction zone. Even though the partial pressure of steam in the product gas from vessel 10 is below this critical value, I have found that agglomeration of the lime to non-fluidizable particles occurs rapidly at the point of introduction of the steam if the partial pressure of the latter exceeds this critical value. This agglomeration takes place despite the rapid mixing of the feed steam in the agitated fluidized bed. Accordingly, the partial pressure of the steam in the mixture of steam and recycle gas fed to vessel 10 through conduit 19 is maintained below about 13 atmospheres. Any additional steam required is supplied through conduit 20 to the perforated distributing pipe 21. The latter is arranged to introduce steam at different levels within the bed of calcium oxide. The amount of steam fed at any level is controlled by the size and number of openings at any given level to ensure that upon entry and admixture with the gases in the reaction bed its partial pressure is below 13 atmospheres.

The reaction between the steam and carbon at a temperature between 1500 and 1750° F. under pressures as specified above produces a gas containing principally hydrogen, methane and carbon monoxide with a small amount of carbon dioxide. In general, the product gas from the generator 10 has the following composition by weight: hydrogen 50 to 75%; methane 10 to 30%; carbon monoxide 1 to 15%; and carbon dioxide 1 to 8%. The per cent conversion of the steam ranges from 50 to 90% depending upon temperature and pressure, and presence or absence of catalyst.

Substantially all of the carbon dioxide produced is absorbed by the lime in situ with resulting generation of heat. The latter serves to supply most of the heat required for the endothermic reaction between the steam and carbon. Substantially all of the remaining heat if required can be supplied as sensible heat of hot lime fed from the regenerator described below. Any additional heat required may be supplied in any suitable manner as by external heating of the walls of the vessel (not shown) or by burning the necessary amount of carbonaceous material within the vessel itself, that is, by feeding in limited amounts of oxygen. The product gas is conveyed from the vessel 10 by a conduit 22 which leads to a cyclone separator 23 where the gas is separated from entrained solids. The latter are then returned to the bed of lime by means of a dip leg 24. The solid free gas is conducted to any suitable storage place or to a subsequent processing stage through the valved conduit 26. A portion of the product gas is recycled through conduit 19 for admixture with feed steam to ensure a partial pressure of the latter of less than 13 atmospheres.

The regeneration of calcium oxide from the calcium carbonate in the above system is accomplished in the following manner. The carbonate along with low carbon ash is continuously withdrawn from the generator vessel 10 through a valved conduit 30, and is picked up by a stream of air circulating through a conduit 32. The air carries the carbonate and carbonaceous ash to a regeneration vessel 34 which is adapted to confine a bed of solids at elevated temperatures. The bed of solids is maintained in a fluidized state by appropriate regulation of gas velocity through the bed. Heat is supplied to the bed by combustion of the low carbon ash. Alternately or additionally the heat may be supplied by the combustion of gas such as producer or methane gas or by injection of hot flue gas from the combustion of char. The temperature maintained in the regenerator is a function of the pressure level and is in general higher the higher the pressure. Thus at atmospheric pressure a temperature of 1700° F is satisfactory while if the regenerator is maintained at 20 atmospheres a temperature of at least 1900° F. must be maintained. It is desirable to operate the regenerator at a temperature that is below the fusion point of the ash so as to avoid agglomeration with the lime. Alternately, the char ash may be separated from the lime prior to its return to the regenerator by means not shown. The flue gas containing carbon dioxide produced in the regenerator is led to an external cyclone separator 36 through a conduit 38 for removal of fine ash. The latter is discharged through a conduit 40 while the flue gas is discharged through a valved conduit 42. The hot regenerated calcium oxide is returned to the generator 10 through the valved conduit 44 which extends into the bed of lime maintained in that vessel .

It may be desirable to add catalysts to the char particularly if the char-steam reaction is conducted at low temperatures of the order of 1500 to 1600° F. Suitable catalysts are alkali metal carbonates impregnated on the chars from aqueous solution.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. The method of producing water gas which comprises feeding steam and carbonaceous solids into a reaction zone containing calcium oxide, maintaining said calcium oxide in a fluidized state, maintaining the reaction zone at a temperature between 1500 and 1750° F. and at a total pressure which is between 15 and 50 atmospheres and, in addition, is at least as high, for any given operating temperature, as the value of $p$ in the following equation $$p = 3.40 - 1.89 \times 10^{-2} (t - 1430) + 4.48 \times 10^{-4} (t - 1430)^2$$

where $p$ is the pressure in atmospheres and $t$ is the temperature in °F., maintaining the partial pressure of said steam below 13 atmospheres throughout the entire reaction zone, maintaining the calcium oxide in said reaction zone under $CO_2$ absorbing conditions and in an amount sufficient to absorb substantially all the carbon dioxide produced, and recovering the gaseous product.

2. The method of producing water gas which comprises feeding steam and carbonaceous solids into a reaction zone containing calcium oxide, maintaining said calcium oxide in a fluidized state, maintaining the reaction zone at a temperature between 1500 and 1750° F. and at a total pressure which is between 15 and 50 atmospheres and, in addition, is at least as high, for any given operating temperature, as the value of $p$ in the following equation $$p = 3.40 - 1.89 \times 10^{-2} (t - 1430) + 4.48 \times 10^{-4} (t - 1430)^2$$

where $p$ is the pressure in atmospheres and $t$ is the temperature in °F., maintaining the partial pressure of said steam below 13 atmospheres throughout the entire reaction zone, maintaining the calcium oxide in said reaction zone under $CO_2$ absorbing conditions and in an amount sufficient to absorb substantially all the carbon dioxide produced, recycling a portion of the gaseous product to the reaction zone in admixture with steam in such proportions that the partial pressure of the latter is less than 13 atmospheres and recovering the remainder of the gaseous product.

3. The method of producing water gas which comprises feeding steam and carbonaceous solids into a reaction zone containing a bed of calcium oxide, one portion of the steam being premixed with recycled gaseous product from said reaction zone before entering the latter in such proportions that the partial pressure of the steam is less than 13 atmospheres and another portion of the steam being fed directly into the interior of the bed of calcium oxide, maintaining said calcium oxide in a fluidized state, maintaining the reaction zone at a temperature between 1500 and 1750° F. and at a total pressure which is between 15 and 50 atmospheres and, in addition, is at least as high, for any given operating temperature, as the value of $p$ in the following equation $$p = 3.40 - 1.89 \times 10^{-2} (t - 1430) + 4.48 \times 10^{-4} (t - 1430)^2$$

where $p$ is the pressure in atmospheres and $t$ is the temperature in °F., maintaining the partial pressure of said steam below 13 atmospheres throughout the entire reaction zone, maintaining the calcium oxide in said reaction zone under $CO_2$ absorbing conditions and in an amount sufficient to absorb substantially all the carbon dioxide produced, recycling a portion of the gaseous product for premixing with a portion of the feed steam, and recovering the remaining gaseous product.

No references cited.